(12) United States Patent
Auten et al.

(10) Patent No.: US 6,912,410 B2
(45) Date of Patent: *Jun. 28, 2005

(54) COMMUNICATION DEVICES AND POWER PACKS THAT INCLUDE A LIGHT SOURCE

(76) Inventors: Christopher L. Auten, 3214 Sixth Ave. NE., Conover, NC (US) 28613; Kirk Steven Wentz, 2418 Norcott St., Newton, NC (US) 28658

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,920

(22) Filed: Aug. 24, 1998

(65) Prior Publication Data

US 2001/0041603 A1 Nov. 15, 2001

(51) Int. Cl.$^7$ ................................................ H04M 1/00
(52) U.S. Cl. .................. 455/572; 455/575.1; 455/90.3; 455/550.1
(58) Field of Search .......................... 455/572, 90, 550, 455/575, 566, 573, 556; 379/447; D14/137, 138

(56) References Cited

U.S. PATENT DOCUMENTS

| | | | | |
|---|---|---|---|---|
| 3,821,539 A | | 6/1974 | Kleinman | 240/6.45 R |
| 4,499,525 A | * | 2/1985 | Mallory | 362/157 |
| 5,169,225 A | * | 12/1992 | Palm | 362/118 |
| 5,297,247 A | * | 3/1994 | Kan | 455/38.4 |
| 5,592,066 A | | 1/1997 | Fan | 320/2 |
| 5,701,341 A | | 12/1997 | Kuo | 379/433 |
| 5,786,106 A | * | 7/1998 | Armani | 429/98 |
| 5,857,148 A | * | 1/1999 | Weisshappel et al. | 455/90 |
| 5,864,766 A | | 1/1999 | Chiang | 455/572 |
| 5,867,795 A | * | 2/1999 | Novis et al. | 455/566 |
| 5,871,272 A | * | 2/1999 | Sharrah et al. | 362/184 |
| 5,878,353 A | * | 3/1999 | Ul Azam et al. | 455/550 |
| 5,884,195 A | * | 3/1999 | Gomez et al. | 455/572 |
| 5,901,206 A | * | 5/1999 | Soon | 379/110.01 |
| 5,950,139 A | * | 9/1999 | Korycan | 455/566 |
| 5,973,477 A | * | 10/1999 | Chang | 320/114 |

FOREIGN PATENT DOCUMENTS

| | | | |
|---|---|---|---|
| DE | 29806392 | 7/1998 | H04M/1/00 |
| JP | 7264278 | 10/1995 | H04M/1/22 |

* cited by examiner

Primary Examiner—Temica M. Beamer
(74) Attorney, Agent, or Firm—Kilpatrick Stockton LLP; Charles W. Calkins

(57) ABSTRACT

Communication devices, portable power devices, and power sources for these devices which include a source of illumination. The source of illumination is positioned and of sufficient candlepower to permit a person holding the device to illuminate his/her surroundings.

7 Claims, 9 Drawing Sheets

COMMUNICATION DEVICES AND POWER PACKS THAT INCLUDE A LIGHT SOURCE

FIELD OF THE INVENTION

The present invention relates to communication devices which include a light source for viewing objects. Embodiments of the present invention include cordless telephones, cellular telephones, pagers and the like. The present invention also relates to power source units ("power packs") for portable devices which include a light source.

BACKGROUND

Communication devices, including mobile radio communication systems, walkie-talkies, cordless telephones, pagers, personal digital assistants, cellular phones (analog and digital), remote control devices (garage door openers, television remotes and the like) and other analog and/or digital communication equipment have become useful tools for business and social use. Portable communication devices allow individuals to move freely and communicate. For example, individuals now can continue to perform tasks at work, in the home, in the car and communicate with others. In addition, the user of a portable communications device is not restricted as to physical location as is the case with telephones that are connected to the wall by wire.

It would be advantageous for users of portable communication devices to be able to utilize the communications device to perform functions other than communicating. For example, users may be in situations where they need to view objects in the vicinity. The user may travel to surroundings that are poorly lit; in such situations visibility may be important to both operation of the communications device and to movement in the surroundings. Prior inventions have addressed visibility to some degree.

U.S. Pat. No. 5,592,066 discloses a mobile phone battery recharger with a light source. The recharger can be used as an emergency flashlight. However, this invention has not integrated the light source into the telephone. Furthermore, illuminated key pads are a common feature on portable phones. The illuminated key pads allow the user to operate the portable telephone in poorly lit surroundings, but do little to enhance the mobility of the user in those surroundings.

Integration of a light source into a simulated handset has been disclosed in U.S. Pat. No. 3,821,539. This invention has no function as a portable telephone. The handset simulates a telephone handset, and there is no ability to communicate with others. One can use the invention only to illuminate items in a car. The invention is portable and can be charged through the cigarette lighter of the automobile.

Current products have addressed the need for a portable light source. However it would be desirable to have a single device that could be utilized for communications and illumination of the user's surroundings. It is conceivable that a communications device user will move in environments that have inadequate lighting, and thus a light source integrated with the device would provide a convenient source of illumination for the user. A portable telephone with an integrated flashlight enables the user to communicate and/or illuminate the surroundings with one single device. Other inventions required the portable telephone user to find a separate light source, and this could often require one to carry two devices; a portable telephone and a flashlight.

There also exists a widespread market for power source units, also referred to as "power packs" of the type that serve as a power source for tools, communication devices, portable audiovisual devices (radios, televisions, and the like) cameras, and other portable devices. It would be advantageous to have a power source unit for these types of devices and others, which included a light source for illuminating the surroundings.

SUMMARY OF THE INVENTION

The present invention provides a communication device that includes a source of illumination. The source of illumination is positioned and of sufficient candlepower to permit a person holding the device to illuminate his/her surroundings. In effect, a communication device of the present invention provides a flashlight in addition to a means for communicating.

The term "communications device" is utilized herein to refer to mobile radio communication systems, walkie-talkies, cordless telephones, pagers, personal digital assistants, cellular phones (analog and digital), remote control devices (garage door openers, television remotes and the like) and other analog and/or digital communication equipment.

In a first aspect, a communications device of the present invention comprises a source of illumination in electrical communication with a power source. The device may further include a switch in electrical communication with the source of illumination and the power source to permit the source of illumination to be switched on and off.

The source of illumination may comprise: a light bulb, including but not limited to conventional incandescent bulbs comprising a wire filament including krypton, tungsten, mercury vapor, hollow cathode, argon, tridium lightbulbs; a light emitting diode (LED); neon lightbulbs; and florescent bulbs. The source should be of sufficient lumens to provide illumination, preferably sufficient illumination to allow a user of the communications device to illuminate at least a portion of the area surrounding the device. Generally, the light source will be at least 0.1 lumen up to 30 lumens when the power source is fully charged.

The power source may comprise a source of direct current, for example a battery. The power source utilized to power the source of illumination may be the same or different as the power source for the communication circuits of the communication device. In the case of a battery power source, the battery may be rechargeable or disposable and may comprise a nickel metal hydride (NiMh) battery; a nickel cadium battery; a battery comprising mercury, cadium, zinc, lead, silver, manganese, lithium, combinations thereof and oxides thereof, including lithium thionyl chloride, lead acid, lithium magnesium dioxide, lead dioxide, alkaline manganese, zinc chloride and/or zinc oxide. In general most if not all forms of alkaline or non-alkaline batteries may be utilized as a battery power source.

The communications device may further comprise communications circuitry, including microphones, speakers, input means, display means, processors, receivers, transmitters, antennas and the like conventionally found in communications devices, such as cellular and/or digital telephones, cordless telephone, pagers and the like.

As used herein the term communications device is used broadly to encompass telephones, including portable phones (cellular and digital), and cordless telephone;

In another aspect, the present invention provides a power source unit (power pack) comprising: a power source and a source of illumination. The power source and source of illumination may be located within a housing or enclosure which includes a lens or aperture for the source of illumination to shine through. The power source unit may further comprise terminals or other means for electrically connecting the power source to electrical circuits to be powered, such as the circuitry in a communications device.

The power source unit is preferably designed to function as a component part of a portable/cordless device. In the case of a power source unit for a communications device, the unit is preferably designed to function as a component part of the device. As such, the external packaging of the power source unit may be configured to interconnect with the communications device to form an integral unit. Similarly, when utilized with a portable power tool the external packaging may be configured to form an integral unit when connected/attached to the tool.

In these embodiments, the source of illumination may be positioned on the power source unit such that when the power source unit is connected to the communications device the source of illumination is not covered to thereby provide light when the power source unit is connected to the portable device.

As will be recognized from the description contained herein, a power source unit of the present invention may be utilized as a power source in a wide variety of portable devices including, but not limited to, tools, communication devices, portable audiovisual devices (radios, televisions, and the like) cameras, and other portable devices.

An advantage of a communications device of the present invention is that the communications device includes a source of illumination that may be used to illuminate the surroundings.

Another advantage of a communications device of the present invention is that the communications device provides the functionality of a flashlight.

An advantage of a power source unit of the present invention is that the power source unit may be utilized in a communications device or other portable devices to provide a source of illumination that may be used to illuminate the surroundings.

Another advantage of a power source unit of the present invention is that the power source unit provides the functionality of a flashlight.

Other features and advantages of the present invention will become apparent from the following detailed description.

DETAILED DESCRIPTION OF THE INVENTION

In a first aspect the present invention provides a communication device comprising:

a housing;
telecommunication circuitry located within the housing;
a lens located in a wall of the housing;
a source of illumination located within the housing and positioned to project a beam of light through the lens; and
a power source for the source of illumination in electrical communication with the source of illumination.

Details relating to these elements of a communications device of the present invention are set forth above and in the following description.

Figure 1A:
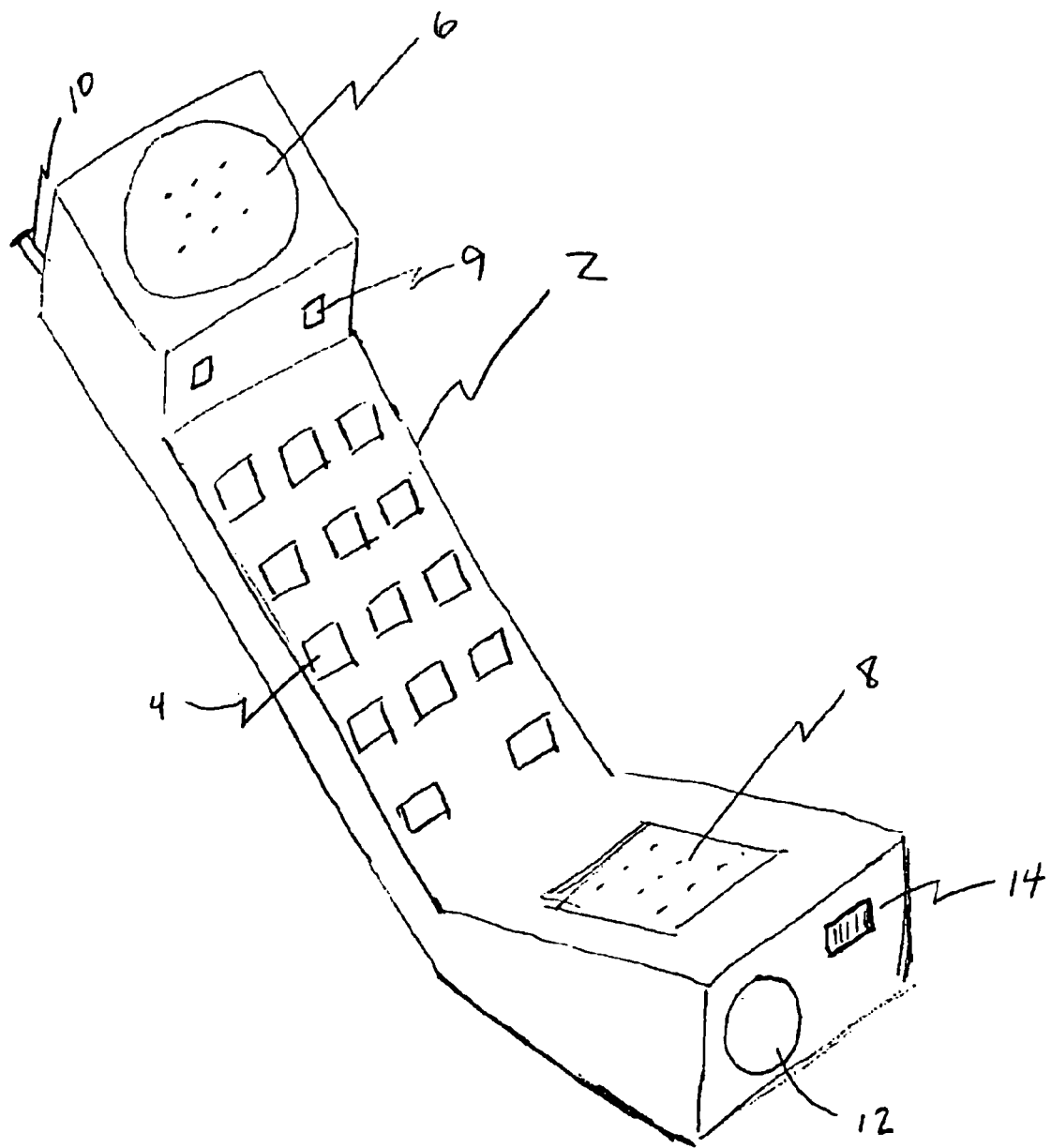
FIGS. 1a, 1b and 1c depict front and back views an embodiment of a communications device of the present invention wherein the communications device is a cordless telephone handset.
Figure 1B:
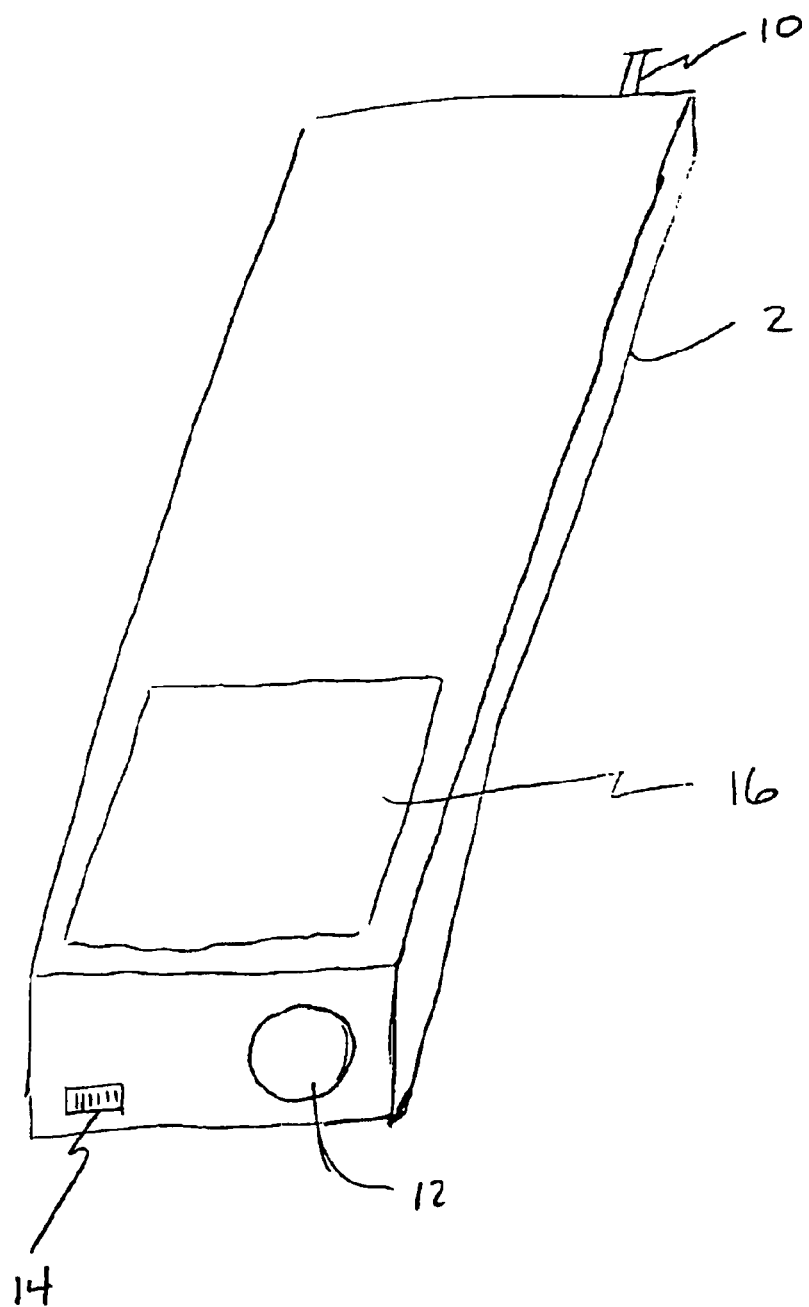
Figure 1C:
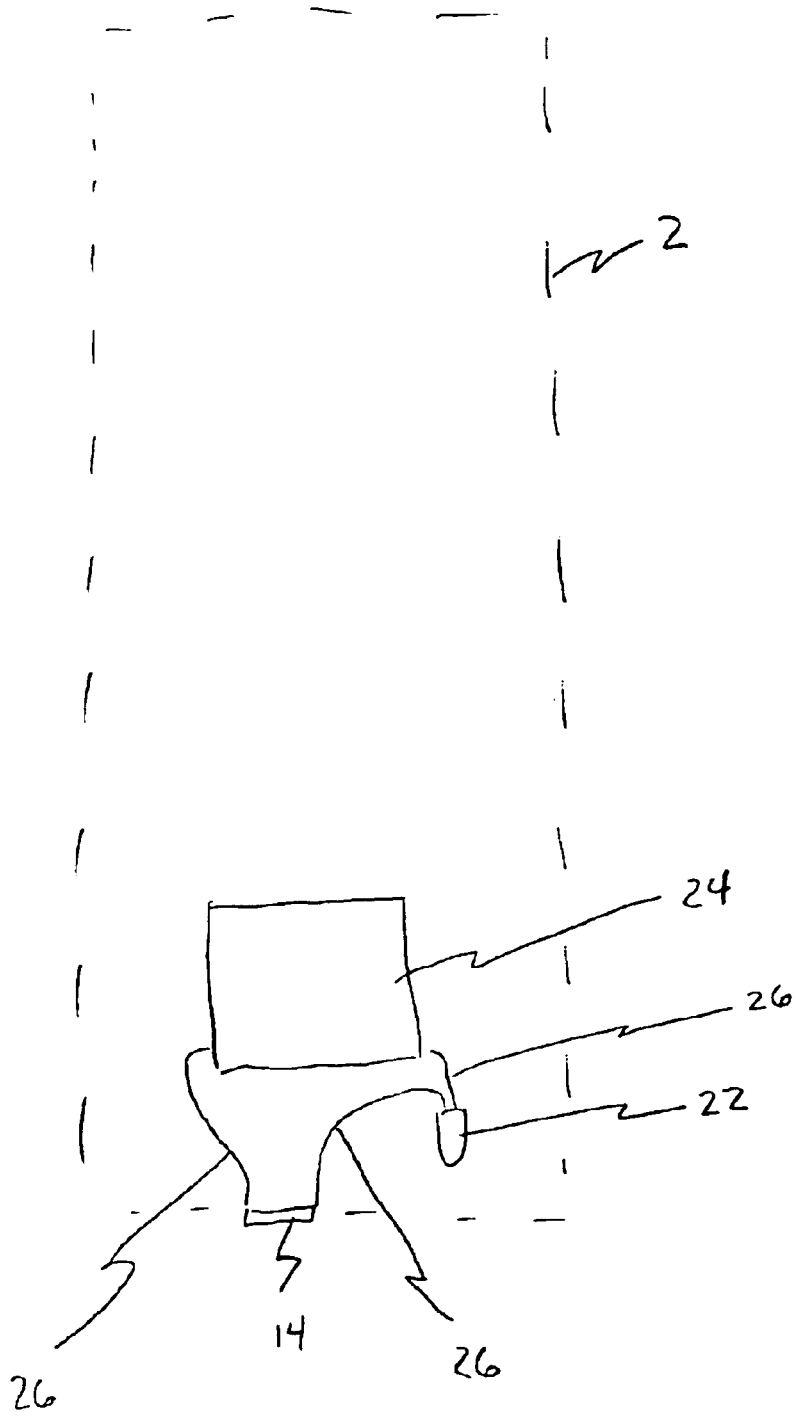

A first possible embodiment of the present invention is depicted in FIGS. 1a, 1b and 1c. FIG. 1a depicts, in top/side view a cordless telephone, 2 of the type utilized in a home environment with a base/charging unit. The cordless telephone includes push buttons, 4 for interacting with the communication circuits of the cordless telephone; speaker port 6; microphone port 8; and antenna 10. These features, and the communication circuits, including the speaker, microphone and telecommunication circuits, of the cordless telephone of the present invention may be produced utilizing commercially available technology. The cordless telephone may additionally include electrical contacts, 9 to permit electrical communication between the cordless telephone and a base unit, for example to permit re-charging of the power source utilized by the cordless telephone.

In this embodiment of the present invention, the "housing" portion of the communications device comprises the cordless telephone housing. The housing may be produced from plastic or other materials conventionally utilized in the production of housings for communication devices.

According to an embodiment of the present invention, the cordless telephone includes an aperture or lens, 12 which is sufficiently transparent or translucent to allow light generated from a light source contained inside the housing of the cordless telephone to pass through and provide illumination. The telephone may further include a switch, 14, in electrical communication with the electrical circuit which includes the light source, to permit the light source to be switched on and off.

FIG. 1b depicts, in back/side view cordless telephone, 2. As shown in FIG. 1b, the cordless telephone includes door, 16 which enables access to a power source for the telephone.

FIG. 1c depicts a possible internal configuration of the electrical and telecommunications hardware of the cordless telephone depicted in FIGS. 1a and 1b. As shown in FIG. 1c, cordless telephone 2 includes light source 22 and power source 24. Light source 22 is positioned adjacent to lens 12 (not shown in FIG. 1c) such that a beam of light will project through lens 12 and illuminate items within the beam. The lens may be produced from glass or plastic and may be clear or colored. An electrical circuit which includes light source 22, power source 24 and switch 14 is formed by wires 26. In the embodiment depicted in FIG. 1, a simple electrical circuit may be utilized wherein switch 14 operates to open the circuit between light source 22 and power source 24 to thereby stop illumination of light source 22. This type of circuit is shown schematically in FIG. 5.

Although not depicted in FIG. 1c, cordless telephone 2 will include additional electrical circuits, which include power source 24, for the telecommunications circuitry and other features of the cordless telephone. In addition the cordless telephone may include contacts or other means for electrically connecting the power source to current for recharging the power source.

Suitable light sources include a light bulb, including but not limited to conventional incandescent bulbs comprising a wire filament including krypton, tungsten, mercury vapor, hollow cathode, argon, tridium lightbulbs; a light emitting diode (LED); neon lightbulbs; and florescent bulbs. The source should be of sufficient lumens to provide illumination, preferably sufficient illumination to allow a user of the communications device to illuminate at least a portion of the area surrounding the device. Generally, the light source will be at least 0.1 lumen up to 30 lumens when the power source is fully charged. It is beneficial for the light source have a low current draw, for example 25 milliAmps to 1 Amp to minimize the power requirements and thereby extend the life, or life between charges, of the power source. Generally the power source will comprise a source of direct current.

The power source may comprise a source of direct current, for example a battery. The power source utilized to power the source of illumination may be the same or different as the power source for the communication circuits of the communication device. In the case of a battery power source, the battery may be rechargeable or disposable and may comprise a nickel metal hydride (NiMh) battery; a nickel cadmium battery; a battery comprising mercury, cadium, zinc, lead, silver, manganese, lithium, combinations thereof and oxides thereof, including lithium thionyl chloride, lead acid, lithium magnesium dioxide, lead dioxide, alkaline manganese, zinc chloride and/or zinc oxide. In general most if not all forms of alkaline or non-alkaline batteries may be utilized as a battery power source. The types of batteries and power sources generally utilized in cordless telephones are suitable for use in a cordless telephone of the present invention.

Suitable switches include slide type switches, push button switches, toggle switches and the like of the type generally utilized in microelectronic devices.

Although FIGS. 1a, 1b and 1c depict an embodiment of a cordless telephone of the present invention a variety of other embodiments are possible and within the scope of the present invention. For example, the location/position of the light source may be changed, for example moved to the speaker side of the cordless telephone. Similarly, the physical position of the power source in relationship to the telecommunication apparatus of the cordless telephone and/or the light source may be changed. The light source may be positioned such that all or a portion of the light source extends outside the housing of the telephone, and may be mounted such that the light source may be swiveled to project a beam in a variety of directions. This type of embodiment could prove advantageous in facilitating the use of the light source to illuminate a pathway while the cordless telephone is being utilized to receive/send a telephone call. The cordless telephone may further include a plurality of light sources, or a multi-position switch, or switches to control various functions of the light source and the electrical circuit including the light source. Further a switch may be omitted and the light source controlled through other means, such as the buttons which communicate with the telecommunications circuitry, or may be "on" whenever the telephone is turned "on". These and other embodiments fall within the scope of the present invention.

Figure 2A:
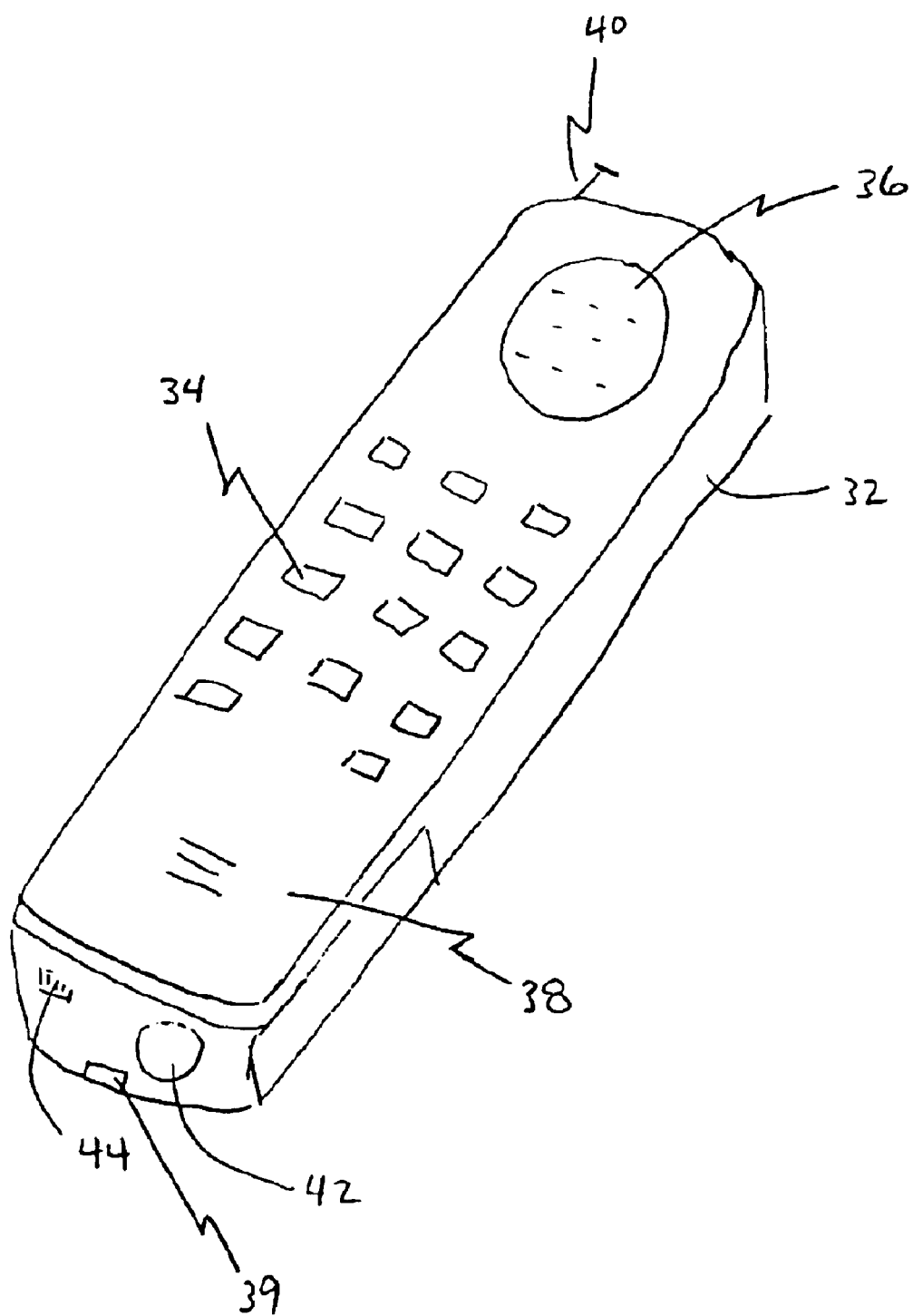
FIGS. 2a, 2b and 2c depict an embodiment of a communications device of the present invention wherein the communications device is a cellular telephone, for example an analog or digital PCS/DCS device.
Figure 2B:
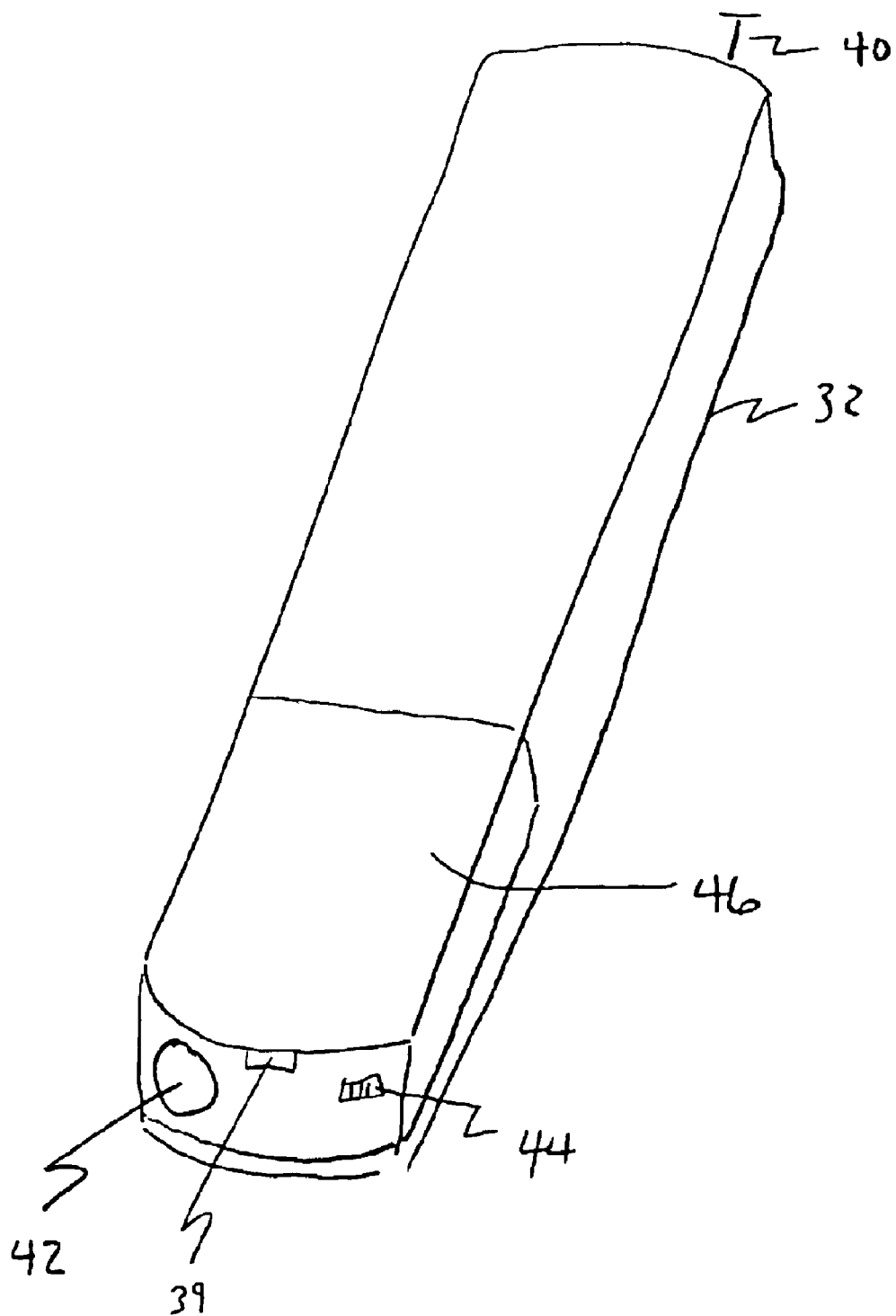
Figure 2C:
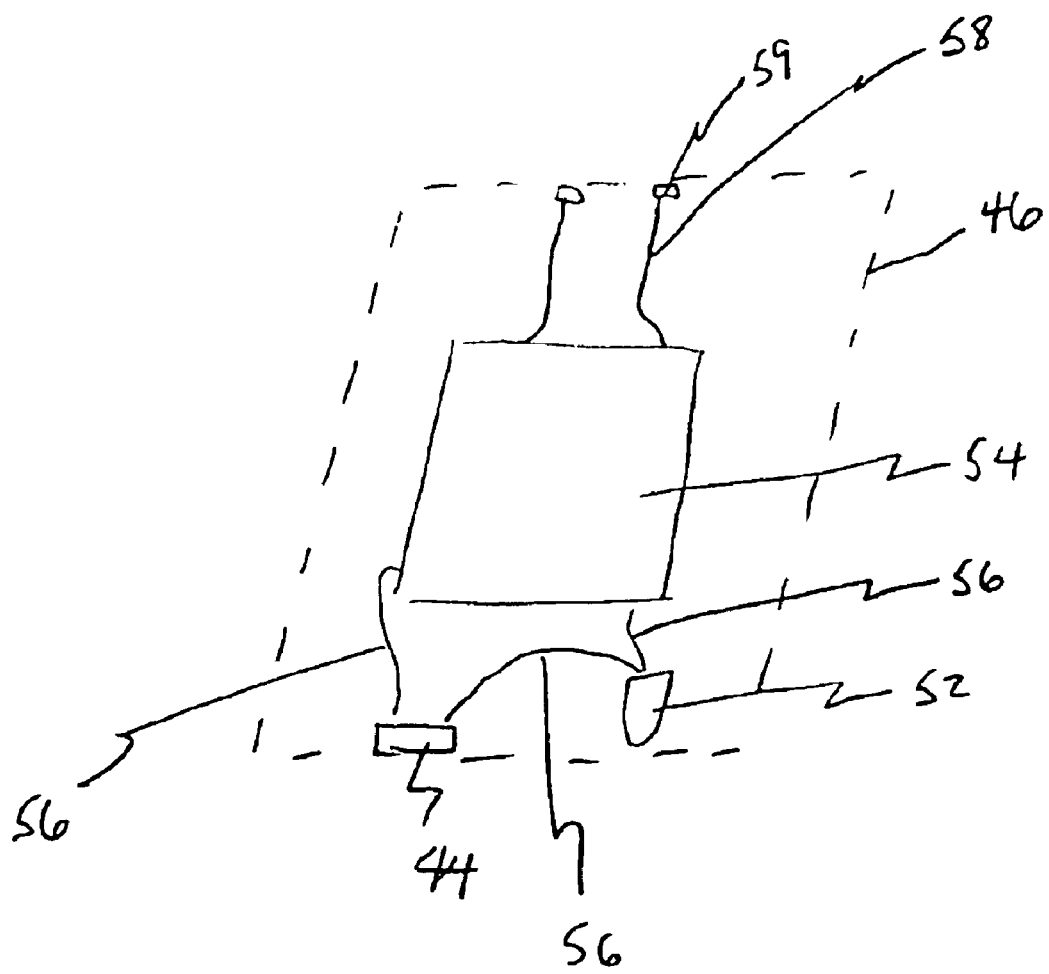

FIGS. 2a, 2b and 2c depict an embodiment of a cellular telephone of the present invention. FIG. 2a depicts, in top/side view a cellular telephone, 32 of the type utilized in for analog and/or digital cellular/PCS/DCS communications. The cellular telephone includes push buttons, 34 for interacting with the communication circuits of the cellular telephone; speaker port 36; microphone port 38; and antenna 40. These features, and the communication circuits, including the speaker, microphone and telecommunication circuits, of the cellular telephone of the present invention may be produced utilizing commercially available technology. The cellular telephone may additionally include electrical contact port, 39 to permit electrical communication between the telephone and a base unit, for example to permit re-charging of the power source utilized by the portable telephone handset.

In this embodiment of the present invention, the "housing" portion of the communications device comprises the cellular telephone housing. The housing may be produced from plastic or other materials conventionally utilized in the production of housings for communication devices.

According to an embodiment of the present invention, the cellular telephone includes an aperture or lens, 42 which is sufficiently transparent or translucent to allow light generated from a light source contained inside the housing of the cellular telephone to pass through and provide illumination. The lens may be produced from glass or plastic and may be clear or colored. The cellular telephone may further include a switch, 44, in electrical communication with the electrical circuit which includes the light source, to permit the light source to be switched on and off.

FIG. 2b depicts, in back/side view cellular telephone 32. As shown in FIG. 2b, the cellular telephone includes a power pack 46 which serves as a power source for the telephone. In the embodiment depicted in FIGS. 2a, 2b and 2c lens 42 and switch 44 are located in the power pack, however other locations are possible and within the scope of the present invention.

FIG. 2c depicts a possible internal configuration of the electrical hardware of power pack 46 of cellular telephone 32 depicted in FIGS. 2a and 2b. As shown in FIG. 2c, power pack 46 includes light source 52 and power source 54. Light source 52 is positioned adjacent to lens 42 (not shown in FIG. 2c) such that a beam of light will project through lens 42 and illuminate items within the beam. An electrical circuit which includes light source 52, power source 54 and switch 44 is formed by wires 56. In the embodiment depicted in FIG. 1, a simple electrical circuit may be utilized wherein switch 44 operates to open the circuit between light source 52 and power source 54 to thereby stop illumination of light source 52. This type of circuit is shown schematically in FIG. 5. The power pack also includes electrical leads/wires 58 leading to electrical contacts 59 to allow electrical communication between power source 44 and the telecommunications circuitry of the cellular telephone.

Although not depicted in FIGS. 2a, 2b or 2c, cellular telephone 32 will include additional electrical circuits, which include power source 54, for the telecommunications circuitry and other features of the telephone. In addition the telephone may include contacts or other means for electrically connecting the power source to current for recharging the power source.

Suitable light sources, power sources, switches and the like for use in a cellular telephone of the present invention include those set forth above.

Although FIGS. 2a, 2b and 2c depict an embodiment of a cellular telephone of the present invention a variety of other embodiments are possible and within the scope of the present invention. For example, the location/position of the light source may be changed, for example moved to the speaker side of the telephone. Similarly, the physical position of the power source in relationship to the telecommunication apparatus of the telephone and/or the light source may be changed. The light source may be positioned such that all or a portion of the light source extends outside the housing of the telephone, and may be mounted such that the light source may be swiveled to project a beam in a variety of directions. This type of embodiment could prove advantageous in facilitating the use of the light source to illuminate a pathway while the telephone is being utilized to receive/send a telephone call. The telephone may further include a plurality of light sources, or a multi-position switch, or switches to control various functions of the light source and the electrical circuit including the light source. Further a switch may be omitted and the light source controlled through other means, such as the buttons which communicate with the telecommunications circuitry, or may be "on" whenever the telephone is turned "on". These and other embodiments fall within the scope of the present invention.

In another aspect, the present invention includes power source units/power packs for portable devices including: communication devices; tools; audio-visual devices, cameras, radios and the like. The power source units comprise: a power source in electrical communication with a light source. The power source and light source may be located within a housing configured to integrate with the housing and function of the portable device. The power source is sufficient to power the apparatus and circuitry of the portable device and power the light source. The light source is sufficient to generate a beam of visible light to illuminate an area within the beam.

Thus, in detail this aspect of the present invention provides a power source unit comprising:
 a housing;
 a lens located in a wall of the housing;
 a source of illumination located within the housing and positioned to project a beam of light through the lens; and
 a power source for the source of illumination in electrical communication with the source of illumination.

Details relating to these elements are set forth above and in the following description.

Figure 3:
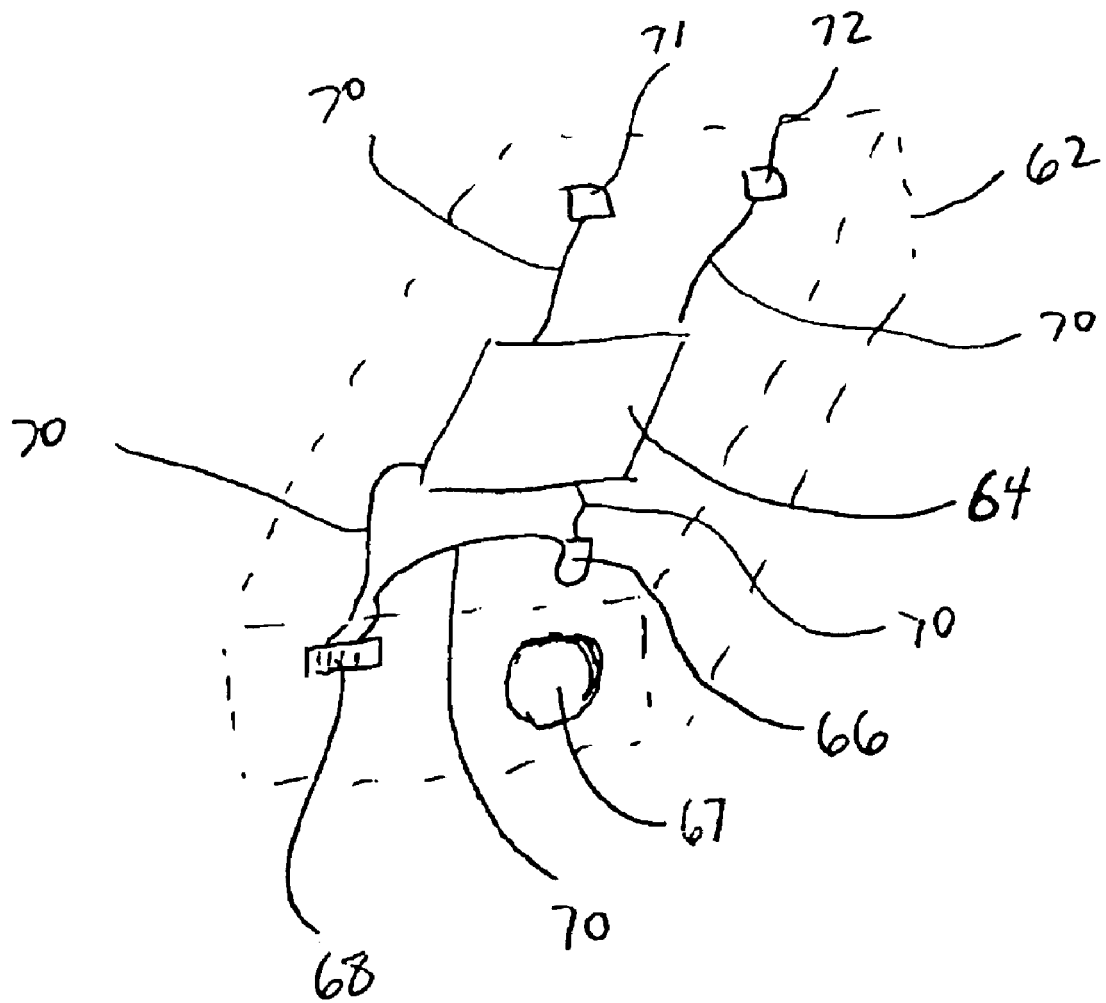
FIG. 3 depicts an embodiment of a power source unit of the present invention.

FIG. 3 depicts a possible embodiment of a power source unit of the present invention. FIG. 3 depicts, in cut-away view, a power pack of the type utilized in portable telephones, such as the portable telephone depicted in FIGS. 1a, 1b and 1c and also utilized in cellular telephones, such as the cellular telephone depicted in FIGS. 2a, 2b and 2c.

As shown in FIG. 3, power source unit 62 includes power source 64, light source 66, switch 68 and electrical contacts 71 and 72. These elements are maintained in electrical communication through leads/wires 70 and are housed in a housing which includes lens 67. The housing may be produced from plastic or other materials conventionally utilized in the production of housings for portable devices such as communication devices, tools, radios and the like. Light source 66 is positioned adjacent to lens 67 such that a beam of light will project through lens 67 and illuminate items within the beam. A switch may be omitted and the light source controlled through other means, such as the buttons which communicate with the telecommunications circuitry, or may be "on" whenever the telecommunications circuitry is turned "on".

Suitable power sources, light sources, switches and electrical circuits include those described above. Electrical contacts 71 and 72 are provided to provide a means of electrical communication between power source 64 and the telecommunications circuitry and apparatus of the telephone. Electrical contacts 71 and 72 may comprise conventional electrical connectors, metallic contacts and the like conventionally utilized in telephones.

Figure 4:
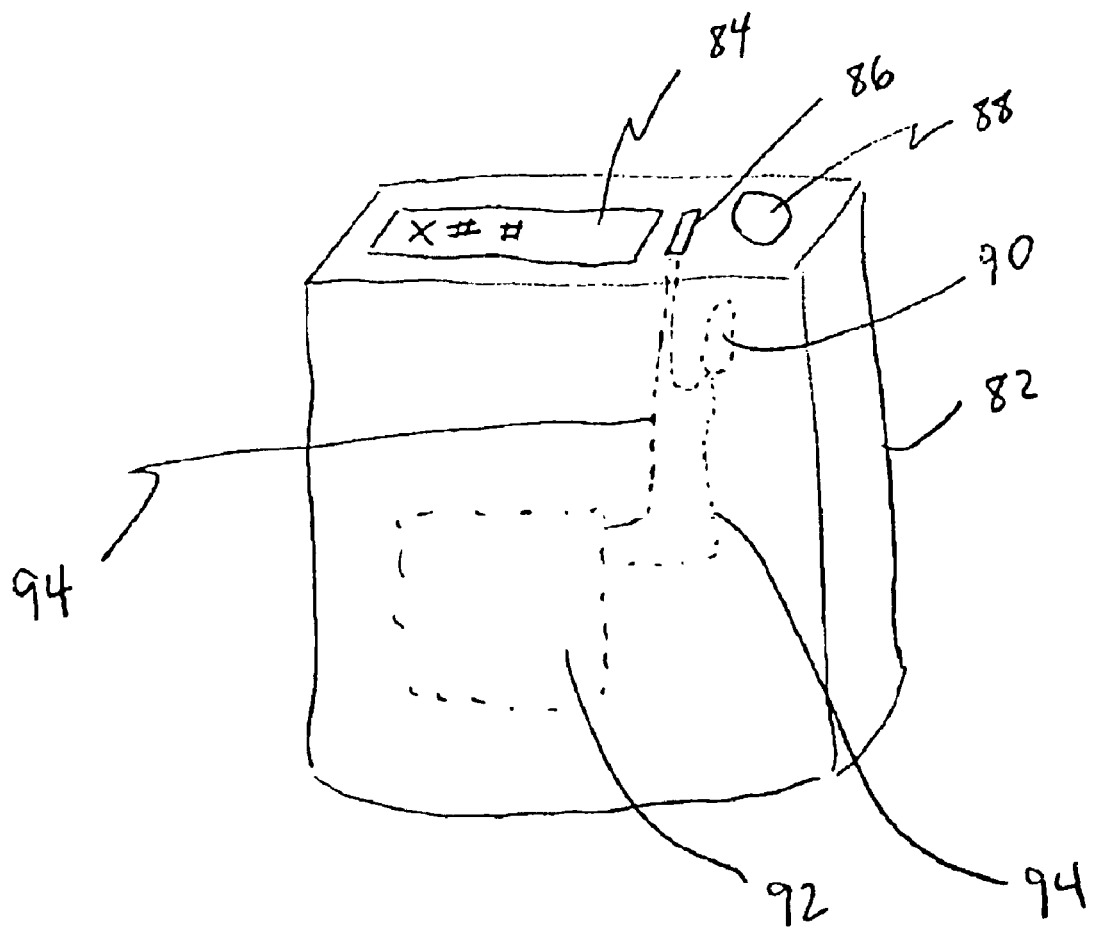
FIG. 4 depicts an embodiment of a communications device of the present invention wherein the communications device is a pager.

FIG. 4 depicts an embodiment of a communications device of the present invention wherein the communications device is a pager. As shown in FIG. 4, pager 82 includes alpha-numeric display 84. According to an embodiment of the present invention, the pager includes an aperture or lens, 88 which is sufficiently transparent or translucent to allow light generated from a light source contained inside the housing of the portable telephone to pass through and provide illumination. The pager may further include a switch, 86, in electrical communication with the electrical circuit which includes the light source, to permit the light source to be switched on and off.

Figure 5:
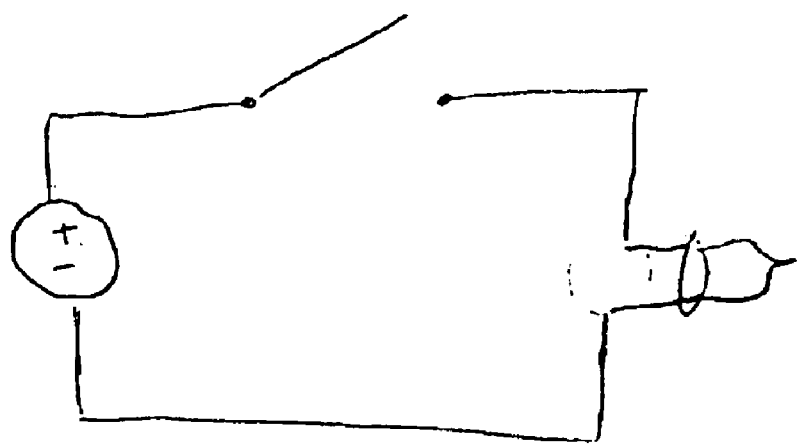
FIG. 5 depicts a sample of an electrical circuit which may be utilized in the present invention.

The internal electrical circuit of pager 82 may comprise light source 90 and power source 92 in electrical communication with switch 86 and each other through electrical leads/wires 94. A typical electrical circuit is depicted in FIG. 5. Suitable light sources, power sources and switches include those described above. Light source 90 is positioned such that a beam of light projects through lens 88 to provide illumination of items within the beam. These elements are housed in a housing. In this embodiment of the present invention, the "housing" portion of the communications device comprises the pager housing. The housing may be produced from plastic or other materials conventionally utilized in the production of housings for communication devices.

Although FIG. 4 depicts an embodiment of a pager of the present invention a variety of other embodiments are possible and within the scope of the present invention. For example, the location/position of the light source may be changed, for example moved to the bottom side of the pager. The light source may be positioned such that all or a portion of the light source extends outside the housing of the telephone, and may be mounted such that the light source may be swiveled to project a beam in a variety of directions. This type of embodiment could prove advantageous in facilitating the use of the light source. The pager may further include a plurality of light sources, or a multi-position switch, or switches to control various functions of the light source and the electrical circuit including the light source. Further a switch may be omitted and the light source controlled through other means, such as the buttons which communicate with the telecommunications circuitry, or may be "on" whenever the pager is turned "on". These and other embodiments fall within the scope of the present invention.

FIG. 5 illustrates an embodiment of a simple electrical circuit which may be utilized in a communications device of the present invention to electrically connect a power source, a light source and a switch.

The features and advantages of the present invention have been described in detail herein with reference to certain embodiments. The present invention is not limited to the embodiments herein described, rather the present invention includes all of the embodiments falling within the scope of the following claims.

What is claimed is:

1. An integrated power source unit for a telecommunications device comprising;
 a power source unit housing adapted to be received by a telecommunications device, the telecommunications device including a substantially parallelpiped housing having a front face, a back face, a first and a second side face, a top end face and a bottom end face;
 a lens located in the wall of the power source unit housing in a location wherein when the power source unit housing is received by the telecommunications device, the lens is positioned within the bottom end face;

a source of illumination located within the power source unit housing and positioned to project a beam of light through the lens to illuminate an area surrounding the telecommunications device with sufficient candlepower to enable a user to view the area; and a power source for the source of illumination in electrical communication with the source of illumination wherein the power source and source of illumination are connected in a closed circuit, the closed circuit being located entirely within the power source unit housing.

2. The power source unit of claim 1 further comprising a switch in electrical communication with the power source and the source of illumination.

3. The power source unit of claim 1 wherein the source of illumination is an incandescent light bulb.

4. The power source unit of claim 1 wherein the source of illumination is an light emitting diode.

5. A cordless telephone comprising the power source unit of claim 1.

6. A cellular telephone comprising the power source unit of claim 1.

7. The power source of claim 1 wherein the source of illumination is capable of generating from 0.1 to 30 lumens.

* * * * *